(12) United States Patent
Reed et al.

(10) Patent No.: US 8,907,586 B1
(45) Date of Patent: *Dec. 9, 2014

(54) METHOD AND APPARATUS FOR POWER DRIVING

(71) Applicant: Marvell World Trade Ltd., St. Michael (BB)

(72) Inventors: Daniel Reed, Sunnyvale, CA (US); Jinho Choi, Saratoga, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/901,186

(22) Filed: May 23, 2013

Related U.S. Application Data

(63) Continuation of application No. 12/884,255, filed on Sep. 17, 2010, now Pat. No. 8,525,434.

(60) Provisional application No. 61/249,506, filed on Oct. 7, 2009.

(51) Int. Cl.
  *G05F 1/00* (2006.01)
  *H02M 3/335* (2006.01)
  *H05B 33/08* (2006.01)

(52) U.S. Cl.
  CPC ....... *H05B 33/0815* (2013.01); *H02M 3/33507* (2013.01)
  USPC .......................................................... 315/291

(58) Field of Classification Search
  USPC ............. 315/291, 307, 224, 246, 247, 200 R, 315/209 R
  See application file for complete search history.

(56) References Cited

U.S. PATENT DOCUMENTS

| | | | |
|---|---|---|---|
| 6,590,447 B1 | 7/2003 | Willis | |
| 6,980,441 B2 | 12/2005 | Man-Ho | |
| 6,995,989 B1 | 2/2006 | Wang | |
| 7,291,993 B2 * | 11/2007 | Bai et al. | 315/307 |
| 7,394,671 B2 | 7/2008 | Fukumoto et al. | |
| 7,411,360 B2 * | 8/2008 | Henry | 315/307 |
| 7,560,879 B2 | 7/2009 | Chen | |
| 7,855,520 B2 * | 12/2010 | Leng | 315/307 |

(Continued)

FOREIGN PATENT DOCUMENTS

JP  2006-101637  4/2006

OTHER PUBLICATIONS

Apr. 19, 2011 International Search Report issued in International Application No. PCT/US2010/049296.

*Primary Examiner* — Minh D A

(57) ABSTRACT

Aspects of the disclosure provide a power circuit to provide electric energy with control and protection for driving a load, such as a light emitting diode (LED) array, and the like. The power circuit includes a converter, a voltage feedback module, a current feedback module and a controller. The converter is configured to receive electric energy from an energy source and to deliver the electric energy for driving the load. The voltage feedback module is configured to generate a first feedback signal based on a voltage of the delivered electric energy. The current feedback module is configured to generate a second feedback signal based on a current of the delivered electric energy. The controller is configured to receive the first feedback signal and the second feedback signal, and to control the converter to receive and deliver the electric energy based on the first feedback signal and the second feedback signal.

20 Claims, 9 Drawing Sheets

(56) References Cited

U.S. PATENT DOCUMENTS

| | | | |
|---|---|---|---|
| 7,906,917 B2 * | 3/2011 | Tripathi et al. | 315/291 |
| 2005/0248965 A1 | 11/2005 | Yamada et al. | |
| 2007/0024213 A1 | 2/2007 | Shteynberg et al. | |
| 2007/0296353 A1 | 12/2007 | Ito et al. | |
| 2008/0007322 A1 | 1/2008 | Asazu et al. | |

* cited by examiner

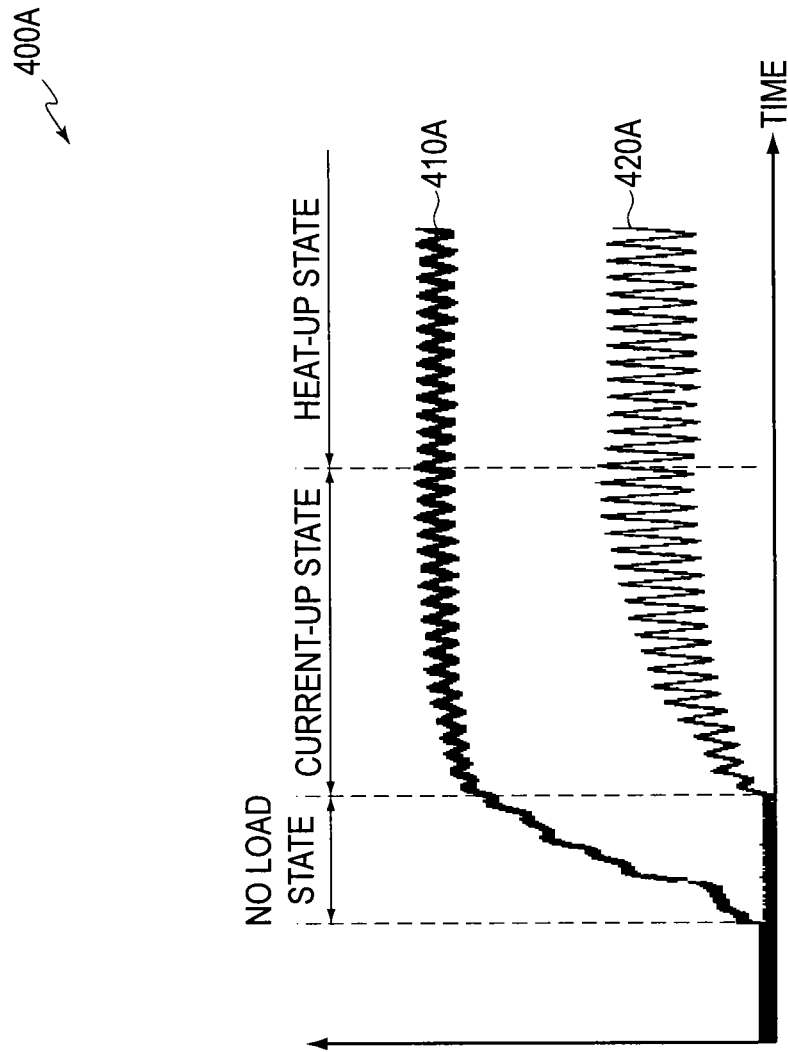

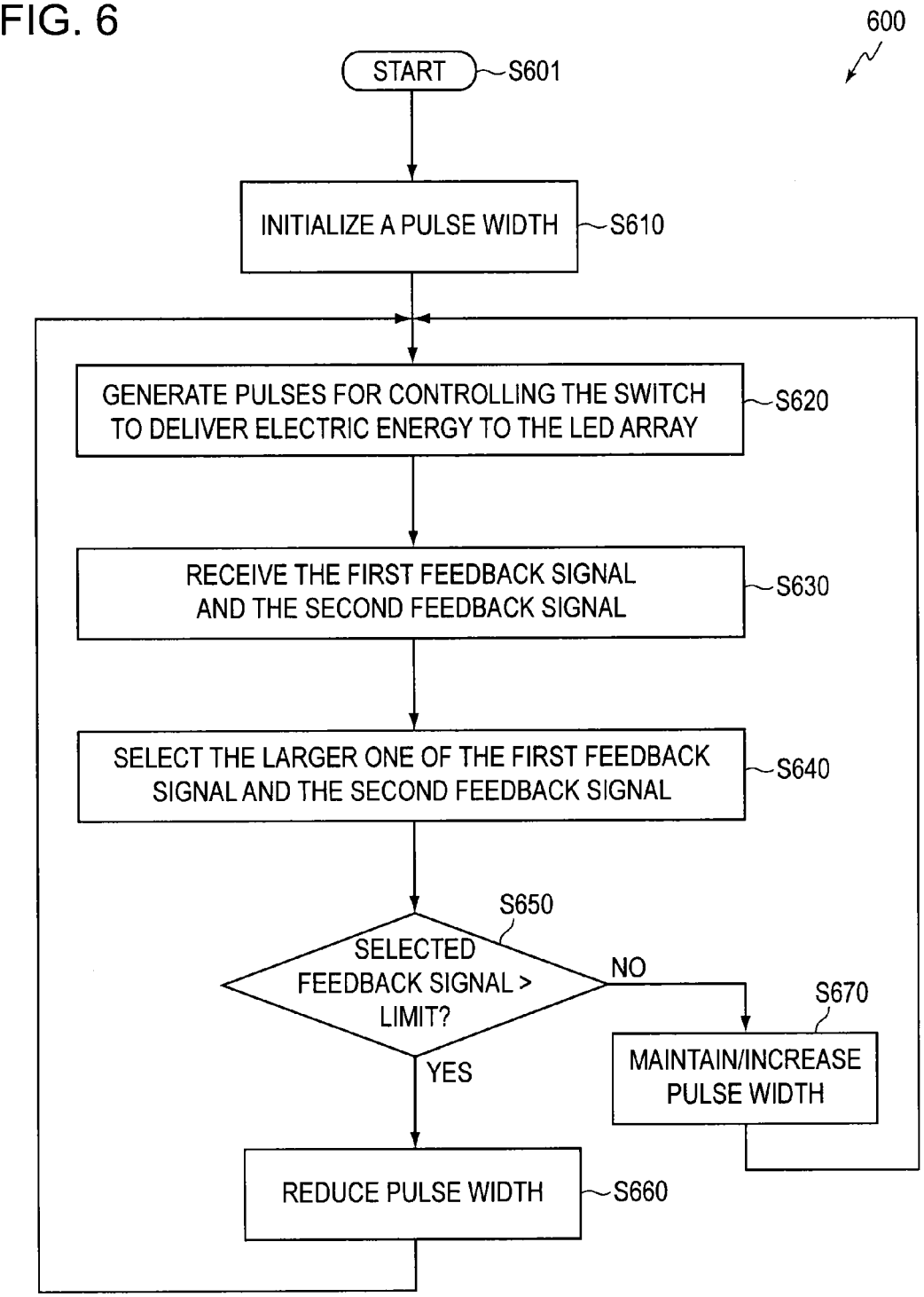

METHOD AND APPARATUS FOR POWER DRIVING

INCORPORATION BY REFERENCE

This application is a continuation of U.S. application Ser. No. 12/884,255, filed Sep. 17, 2010, which claims the benefit of U.S. Provisional Application No. 61/249,506 "Low Cost LED Voltage and Current Feedback Loop Circuit" filed on Oct. 7, 2009, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Light emitting diode (LED) lighting devices provide the advantages of low power consumption and long service life. Thus, LED lighting devices may be used as general lighting equipment in the near future to replace, for example, fluorescent lamps, bulbs, and the like.

SUMMARY

Aspects of the disclosure provide a power circuit to provide electric energy with control and protection for driving a load, such as a light emitting diode (LED) array, and the like. The power circuit includes a converter, a voltage feedback module, a current feedback module and a controller. The converter is configured to receive electric energy from an energy source and to deliver the electric energy for driving the load. The voltage feedback module is configured to generate a first feedback signal based on a voltage of the delivered electric energy. The current feedback module is configured to generate a second feedback signal based on a current of the delivered electric energy. The controller is configured to receive the first feedback signal and the second feedback signal, and to control the converter to receive and deliver the electric energy based on the first feedback signal and the second feedback signal.

In an embodiment, the converter includes a transformer having a primary winding on a receiving path and a secondary winding on a delivering path, and a switch on the receiving path. The switch is configured to switch on the receiving path to receive and store the electric energy and to switch off the receiving path to allow the delivering path to deliver the stored electric energy to the load. The controller is configured to control a turn-on time of the switch based on a dominant feedback signal of the first feedback signal and the second feedback signal.

In an embodiment, the voltage feedback module includes a voltage divider configured to generate the first feedback signal by dividing the voltage on the delivering path. Further, the current feedback module includes a sensing module configured to generate the second feed back signal as a function of a load current. In an example, the sensing module includes a resistor coupled with the load in series. The sensing module senses a voltage drop on the resistor. In addition, in an example, the sensing module includes a scaling circuit configured to scale the voltage drop on the resistor.

According to an aspect of the disclosure, the controller is configured to reduce the turn-on time when the dominant feedback signal is larger than a limit. In an implementation example, the controller includes a first diode and a second diode coupled together. The first diode has a first anode receiving the first feedback signal and a first cathode. The second diode has a second anode receiving the second feedback signal and a second cathode that is coupled with the first cathode to output the dominant feedback signal.

Aspects of the disclosure provide an LED lighting device that includes the power circuit and an LED array. The power circuit provides electric energy to the LED array. The LED array emits light in response to the received electric energy.

Aspects of the disclosure provide a method for driving an LED array. The method includes generating a first feedback signal based on a voltage of electric energy delivered from a converter for driving the LED array, generating a second feedback signal based on a current of the electric energy delivered to the LED array, and controlling the converter to receive and deliver the electric energy based on the first feedback signal and the second feedback signal.

To control the converter to receive and deliver the electric energy based on the first feedback signal and the second feedback signal, the method includes controlling a turn-on time of a switch that couples a receiving path to receive electric energy and to store the received electric energy in a transformer. The transformer has a primary winding on the receiving path and a secondary winding on a delivering path. In an example, the method includes selecting a dominant feedback signal of the first feedback signal and the second feedback signal, and controlling the turn-on time of the switch based on the dominant feedback signal.

To generate the first feedback signal, the method includes dividing a voltage on the delivering path. To generate the second feedback signal, the method includes sensing a voltage drop on a resistor that is coupled with the LED array in series.

BRIEF DESCRIPTION OF THE DRAWINGS

Various embodiments of this disclosure that are proposed as examples will be described in detail with reference to the following figures, wherein like numerals reference like elements, and wherein:

FIG. 4A shows a plot 400A tracing electrical parameters during a cold start-up of the power system example 200 according to an embodiment of the disclosure;

FIG. 6 shows a flow chart outlining a process example 600 for the controller 240 to generate pulses according to an embodiment of the disclosure.

DETAILED DESCRIPTION OF EMBODIMENTS

Figure 1A:
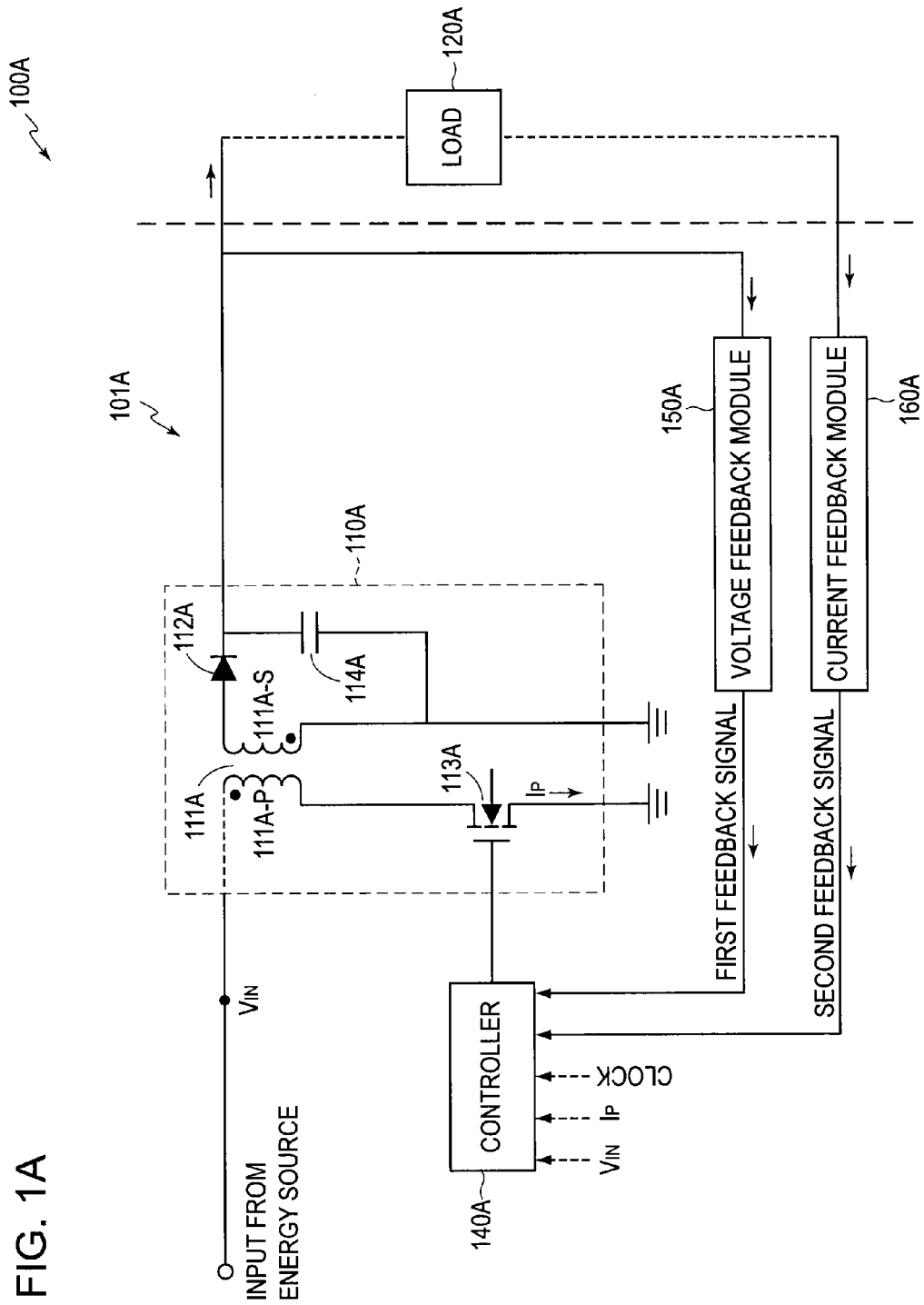
FIG. 1A shows a block diagram of a power system example 100A according to an embodiment of the disclosure.

FIG. 1A shows a block diagram of a power system example 100A according to an embodiment of the disclosure. The power system 100A includes a power circuit 101A and a load 120A. The power circuit 101A receives electric energy from an energy source, and delivers the electric energy with regulated voltage and regulated current to the load 120A. In an embodiment, the power circuit 101A includes a converter 110A, a voltage feedback module 150A, a current feedback module 160A, and a controller 140A. These elements are coupled together as shown in FIG. 1A.

The converter 110A receives input of electric energy from any suitable energy source, and delivers the electric energy under the control of the controller 140A to achieve the regulated voltage and the regulated current. In an embodiment, the converter 110A includes a transformer 111A, a switch 113A, a rectifier diode 112A, and a capacitor 114A. These elements are coupled together as shown in FIG. 1A.

Specifically, the transformer 111A includes a primary winding 111A-P, and a secondary winding 111A-S. The primary winding 111A-P and the switch 113A are coupled in series, for example, to form a receiving path to receive the electric energy from an energy source. The energy source can be any suitable energy supply, such as an AC voltage supply, a DC voltage supply and the like. The power circuit 101A can include components to suitably process the input from the energy source. In an example, the power circuit 101A includes a bridge rectifier (not shown) to rectify the input from an AC voltage supply. Further, the power circuit 101A includes a filter circuit (not shown) to reduce noises coming from the AC voltage supply. In addition, the power circuit 101A can include a monitor circuit (not shown) to monitor the input, such as an input voltage Vin, from the AC voltage supply.

The switch 113A controls the receiving path to receive electric energy from the energy source. In an example, when the switch 113A is switched on, the receiving path is coupled to the energy source to receive the electric energy; and when the switch 113 is switched off, the receiving path is decoupled from the energy source.

The secondary winding 111A-S, the rectifier diode 112A, and the capacitor 114A can be coupled together to form a delivering path to deliver electric energy to a load, such as the load 120A. The power circuit 101A can be suitably configured into an isolated configuration or a non-isolated configuration. In the FIG. 1A example, the power circuit 101A is configured into a non-isolated configuration. Specifically, a terminal of the receiving path is connected to ground (i.e., a terminal of the switch 113A), and a terminal of the delivering path is also connected to the same ground (i.e., a terminal of the secondary winding 111A-S). Thus, in this example, the receiving path and the delivering path are not isolated.

Further, the transformer 111A, the rectifier diode 112A, and the switch 113A are configured to enable a flyback transformer operation. More specifically, when the switch 113A is switched on, the receiving path is coupled to the energy source to receive electric energy, and a switch current Ip flows through the primary winding 111A-P of the transformer 111A, and the switch 113A. The polarity of the transformer 111A and the direction of the rectifier diode 112A are arranged, such that there is no current in the secondary winding 111A-S of the transformer 111A when the switch 113A is switched on. Thus, the received electric energy is stored in the transformer 111A.

When the switch 113A is switched off, the receiving path is decoupled from the energy source, and the switch current Ip becomes zero. The polarity of the transformer 111A and the direction of the rectifier diode 112A enable the delivering path to deliver the stored electric energy to the load 120A.

According to an embodiment of the disclosure, the switch 113A is repetitively switched on and off. Thus, the receiving path repetitively receives the electric energy and stores the electric energy in the transformer 111A. Then, the delivering path repetitively delivers the stored electric energy to the load 120A.

According to an embodiment of the disclosure, the switch 113A is suitably controlled by a relatively high frequency pulse signal. In an embodiment, the AC voltage supply has a frequency of 50 Hz. The controller 140A provides a pulse signal having a much higher frequency than 50 Hz, for example, in the order of KHz or MHz, to switch on and switch off the switch 113A. Each time, the controller 140A switches on and switches off the switch 113A, the switch current Ip has a spike. The peak value of the spike is a function of the AC voltage supply during the switch-on time. Thus, an average of the switch current Ip has substantially the same phase as the voltage of the AC voltage supply. Thus, using the relatively high frequency pulse signal, the power circuit 101A enables power factor correction (PFC).

Additionally, in an embodiment, a pulse width of the relatively high frequency pulse signal is adjustable. The pulse width determines a turn-on time of the switch 113A. The turn-on time further determines the amount of electric energy received, stored and delivered by the converter 110A in a switching cycle.

The voltage feedback module 150A uses any suitable technique to generate a first feedback signal as a function of a delivered voltage from the converter 110A. The current feedback module 160A uses any suitable technique to generate a second feedback signal as a function of a delivered current from the converter 110A. In an embodiment, both the first feedback signal and the second feedback signal are voltage signals. In an example, the first feedback signal is generated by a voltage divider that divides the delivered voltage according to a predetermined ratio. The second feedback signal is generated as a voltage drop on a resistor that the delivered current flows through.

The controller 140A generates pulses based on the first feedback signal and the second feedback signal to control the switch 113A. Thus, the converter 110A, the voltage feedback module 150A, the current feedback module 160A and the controller 140A form a feedback control loop to provide energy control and circuit protection at various operation states for the power circuit 101A and the load 120A.

In an example, the load 120A includes a light emitting diode (LED) array (not shown) for emitting light in response to the delivered electric energy. The power circuit 101A provides electric control and circuit protection to the LED array at a no-load state, a current-up state, a heat-up state, and a steady state, for example.

In the no-load state, the LED array fails to be the load or appears to be no-load to the power circuit 101A. In an example, the LED array fails to be electrically coupled to the delivering path due to, for example, a broken wire. In another example, the LED array requires a forward voltage to enable conducting current. When the voltage on the delivering path is smaller than the forward voltage, the LED array does not conduct current, and the LED array appears as no-load to the delivering path.

In the no-load state, the voltage on the delivering path rises rapidly, and can reach dangerous levels if suitable protection technique is not applied. According to an embodiment of the disclosure, in the no-load state, the first feedback signal is dominant, and the controller 140A generates pulses based on the first feedback signal. When the first feedback signal, which is generated as a function of the voltage on the delivering path, is larger than a threshold, the controller 140A temperately stops generating pulses, and thus the voltage on the delivering path stops rising.

In another embodiment, when the first feedback signal is larger than a threshold, the controller 140A adjusts the pulse width to reduce the turn-on time of the switch 113A, and thus the voltage on the delivering path rises relatively slowly.

When the voltage on the delivering path is larger than the forward voltage, the power system 100A enters the current-up state. In the current-up state, the LED array starts conducting current, and starts emitting light. Generally, the LED array has a relatively slow response, thus the conducted current rises slowly. Thus, in the current-up state, the first feedback voltage is still dominant, and the controller 140A generates pulses based on the first feedback signal.

According to an embodiment of the disclosure, when the first feedback signal, which is generated as a function of the voltage on the delivering path, is larger than a threshold, the controller 140A reduces the pulse width to reduce the turn-on time of the switch 113A, and thus the voltage on the delivering path does not rise rapidly in the current-up state. In another embodiment, the controller 140A temperately stops generating pulses.

When the conducted current of the LED array reaches a specific level, such as a level that causes the second feedback signal to be larger than the first feedback signal, the power system 100A enters the heat-up state. In the heat-up state, the second feedback signal is dominant. The controller 140A generates pulses based on the second feedback signal to maintain a relatively stable current flowing through the LED array, and offset variations due to temperature changes. Generally, the light intensity is a function of the conducted current by the LED array. When the relatively stable current flows through the LED array, the light emitted by the LED array has a relatively stable light intensity.

In an example, when the second feedback signal, which is generated as a function of the delivered current to the LED array, is larger than an upper bound, the controller 140A reduces the pulse width to reduce the turn-on time of the switch 113A, and thus reduces the electric energy delivered to the LED array. On the other hand, when the second feedback signal is smaller than a lower bound, the controller 140A increases the pulse width to increase the turn-on time of the switch 113A, and thus increases the electric energy delivered to the LED array.

Additionally, in the heat-up state, as the LED array conducts current and emits light, the temperature of the LED array rises, and causes electrical properties, such as the forward voltage, I-V characteristic, and the like, to change. The controller 140A adjusts the pulse width to offset the temperature-induced variations, and thus keeps the emitted light intensity to be relatively stable.

At some point, the temperature stops rising and stays in a relatively stable range, then the power system 100A enters the steady state. In the steady state, the second feedback signal is dominant, and the controller 140A generates pulses based on the second feedback signal to maintain the relatively stable current flowing through the LED array. For example, when the second feedback signal, which is generated as a function of the delivered current to the LED array, is larger than an upper bound, the controller 140A reduces the pulse width, and thus reduces the electric energy delivered to the LED array. On the other hand, when the second feedback signal is smaller than a lower bound, the controller 140A increases the pulse width, and thus increases the electric energy delivered to the LED array.

It is noted that the controller 140A can also generate pulses based on other suitable signals, such as a signal CLOCK that is indicative of a switching clock, a signal Vin that is indicative of an input voltage, a signal Ip that is indicative of the current flowing through the switch 113A, and the like.

Figure 1B:
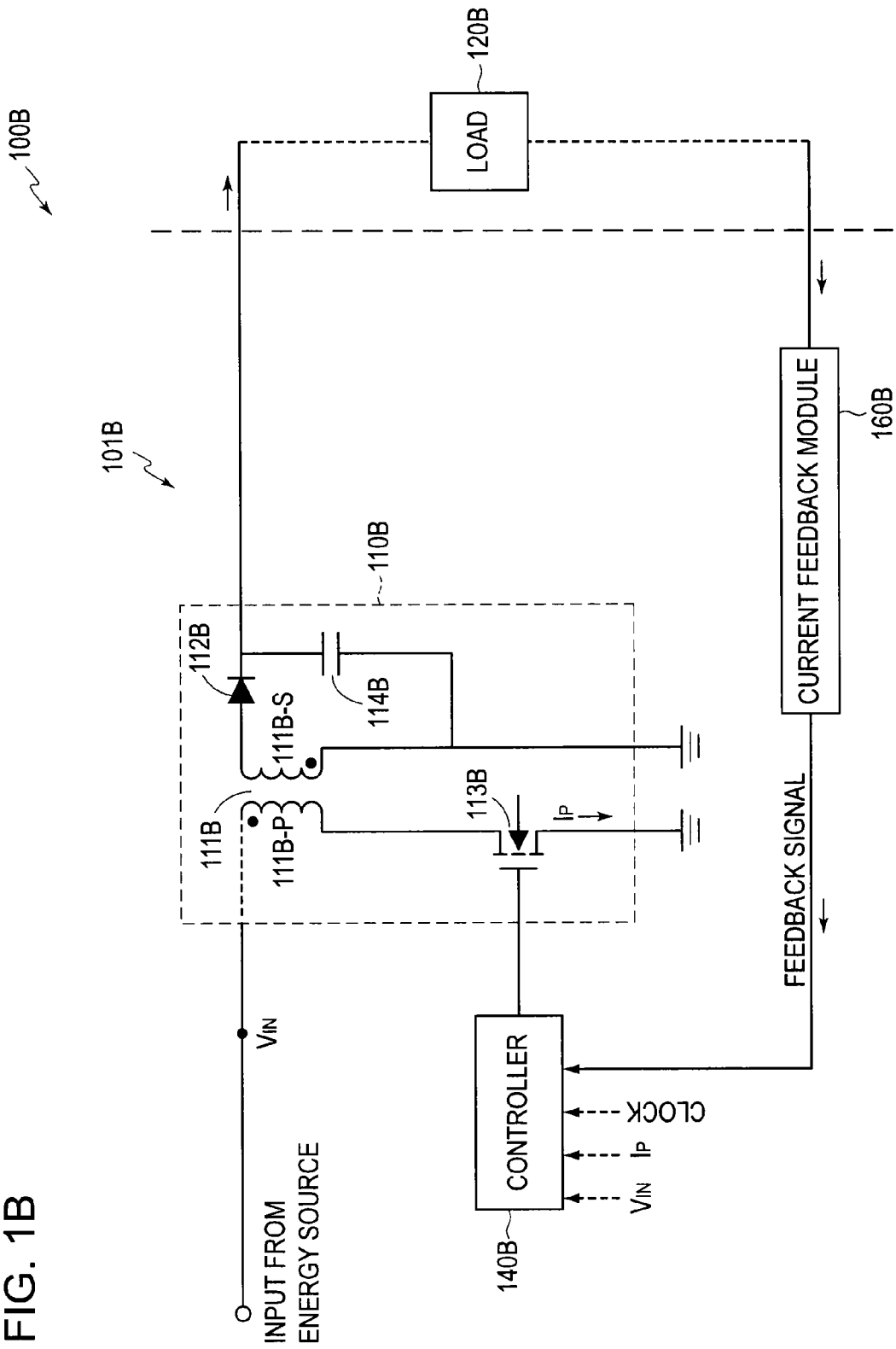
FIG. 1B shows a block diagram of a comparison power system example 100B.

FIG. 1B shows a comparison power system 100B. The comparison power system 100B utilizes certain components that are identical or equivalent to those used in the power system 100A; the description of these components has been provided above and will be omitted here for clarity purposes. However, the comparison power system 100B does not include a voltage feedback module to provide the first feedback signal to the controller 140B. The controller 140B controls the switch 113B based on the feedback signal, which is generated as a function of the current flowing through the load 120B. The comparison power system 100B may suffer damages due to excess voltage on the delivering path. In an example, the load 120B is not electrically coupled to the delivering path. Due to the reason that the feedback control loop is broken, the voltage on the delivering path continually rises, and can cause damages.

In another example, the load 120B, such as an LED array, is electrically coupled to the delivering path. However, the feedback control loop is relatively slow due to, for example, a slow reaction of the LED array, a delay caused by pulse-based PFC, and the like. Thus, before the feedback control loop reacts effectively, the voltage on the delivering path rises rapidly and reaches dangerous levels.

It is noted that various techniques can be used to implement the voltage feedback module 150A, the current feedback module 160A, and the controller 140A.

Figure 2:
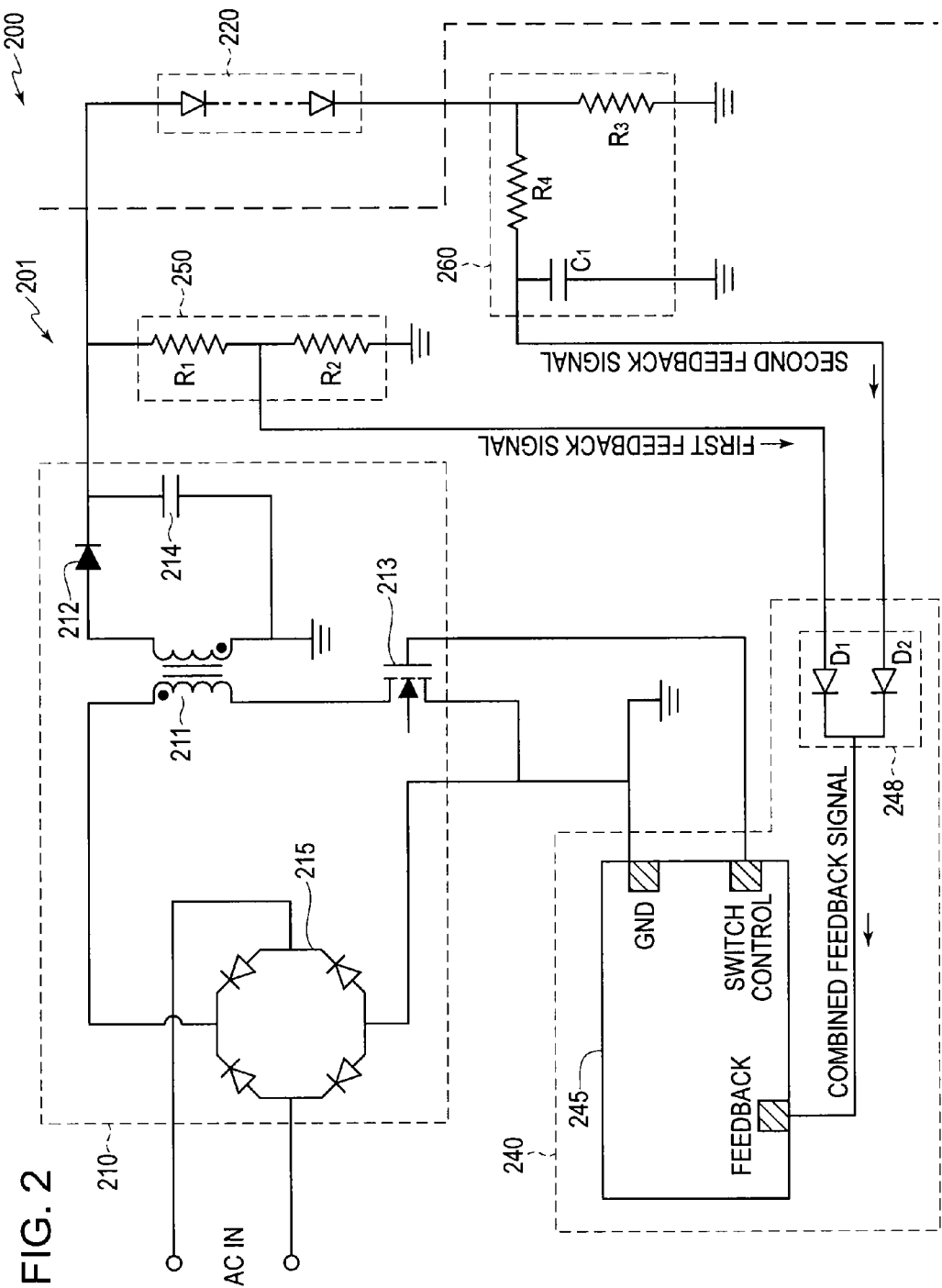
FIG. 2 shows a block diagram of a power system example 200 according to an embodiment of the disclosure.

FIG. 2 shows a block diagram of a power system example 200 according to an embodiment of the disclosure. The power system 200 includes a power circuit 201 that drives an LED array 220. The power system 200 utilizes certain components that are identical or equivalent to those used in the power system 100A; the description of these components has been provided above and will be omitted here for clarity purposes.

In the FIG. 2 example, the converter 210 receives electric energy from an AC voltage supply. The converter 210 includes a bridge rectifier 215 that rectifies the input from the AC voltage supply.

The voltage feedback module 250 includes two resistors R1 and R2 that are coupled in series to form a voltage divider to generate the first feedback signal as a function of the voltage on the delivering path. The resistance ratio of R1 and R2 determines the ratio of the voltage divider.

The current feedback module 260 includes a sensing resistor R3 that is coupled with the LED array 220 in series to conduct the same current as the LED array 220. The current feedback module 260 generates the second feedback signal as a voltage drop on the sensing resistor R3, which is a function of the conducted current of the LED array 220. Further, the current feedback module 260 includes a capacitor C1 and a resistor R4 that form a filter to reduce high frequency components in the second feedback signal.

The controller 240 controls the switch 213 based on the first feedback signal and the second feedback signal. In an embodiment, the controller 240 is implemented using a circuit 245 and a combiner circuit 248. The circuit 245 is an existing control circuit, such as an existing integrated circuit (IC) chip, an existing intellectual property (IP) block, and the like, that generates a pulse signal based on a feedback signal. In an example, the circuit 245 includes a feedback pin to receive the feedback signal, and a switch control pin to provide the pulse signal to the switch 213. The combiner circuit 248 combines the first feedback signal with the second feedback signal, and provides the combined feedback signal to the feedback pin of the circuit 245.

In an embodiment, the combiner circuit 248 is implemented using a three-pin diode package 248 to provide a relatively low cost solution to combine the first feedback signal and the second feedback signal. The three-pin diode package 248 includes a first diode D1 having a first anode and a first cathode, and a second diode D2 having a second anode and a second cathode. The three-pin diode package 248 includes a first anode pin for the first anode, a second anode pin for the second anode, and a cathode pin coupled with the first cathode and the second cathode. In an example, the first anode pin receives the first feedback signal, the second anode pin receives the second feedback signal, and the shared cathode pin provides the combined feedback signal to the circuit 245.

In an embodiment, the circuit 245 operates based on a voltage signal received on the feedback pin. In an example, when the voltage signal received at the feedback pin is larger than 2.5V, the circuit 245 reduces the pulse width of the generated pulses. In another example, the circuit 245 temperately stops generating pulses.

In the FIG. 2 example, the voltage signal received on the feedback pin is determined by the dominant one of the first feedback signal and the second feedback signal. For example, when the first feedback signal is larger than the second feedback signal, the voltage signal on the feedback pin is determined by the first feedback signal; and when the first feedback signal is smaller than the second feedback signal, the voltage signal on the feedback pin is determined by the second feedback signal.

In an example, the ratio of the voltage divider is 0.22. When the voltage on the delivering path is larger than 13V, the first feedback signal is larger than 2.8V. Then, when the first diode D1 has a forward voltage of 0.3V, the voltage signal received on the feedback pin is larger than 2.5V.

In another example, the current flowing through the LED array is larger than 350 mA, and the sensing resistor R3 has a resistance of 8.2Ω, thus the second feedback signal is larger than 2.8V. Then, when the second diode D2 also has a forward voltage of 0.3V, the voltage signal on the feedback pin is larger than 2.5V.

During operation, for example, when an external switch (not shown) is switched on, the AC supply is coupled to the power circuit 201, and the power system 200 enters the no-load state. In the no-load state, the circuit 245 generates pulses to have an initial pulse width. The pulses control the switch 213 to receive and deliver electric energy to the LED array 220. However, the LED array 220 does not conduct current before the forward voltage requirement is satisfied, and thus the voltage on the delivering path rises rapidly In the no-load state, the first feedback signal is dominant. In an example, when the first feedback signal is smaller than 2.8V, the feedback pin is smaller than 2.5V, and the circuit 245 maintains or increases the pulse width. When the first feedback signal is larger than 2.8V, the feedback pin is larger than 2.5V, and the circuit 245 reduces the pulse width.

When the voltage on the delivering path satisfies the forward voltage of the LED array 220, the power system 200 enters the current-up state. In the current-up state, the LED array starts conducting current, and starts emitting light. Generally, the LED array 220 has a relatively slow response, thus the conducted current rises slowly. In the current-up state, the first feedback signal is still dominant. The circuit 245 controls the pulse generation based on the first feedback signal to prevent the voltage on the delivering path to rise to dangerous level.

When the conducted current reaches a specific value that the second feedback signal is larger than the first feedback signal, the second feedback signal is dominant, and the power system 200 enters the heat-up state. In the heat-up state, the circuit 245 controls the pulse generation based on the second feedback signal to maintain substantially stable current delivered to the LED array 220. In addition, in the heat-up state, the temperature of the LED array 220 rises. The rising temperature causes various electrical properties of the LED array 220 to change. For example, when temperature rises, the forward voltage of the LED array 220 drops, and the LED array 220 tends to conduct more current with the same delivered voltage. As the conducted current rises, the second feedback signal rises. In an example, when the second feedback signal is larger than 2.8V, the voltage on the feedback pin of the circuit 245 is larger than 2.5V, and the circuit 245 generates pulses with reduced pulse width. The pulses are provided to the switch 213 to reduce the turn-on time, and to reduce the electric energy delivered to the LED array 220. The reduced electric energy offsets the forward voltage drop of the LED array 220.

At certain point, the temperature becomes relatively stable, and the power system 200 enters the steady state. In the steady state, the forward voltage of the LED array 220 also drops to a relatively stable value, and the second feedback signal is dominant. Then, the circuit 245 controls the pulse generation based on the second feedback signal to maintain the relatively stable current delivered to the LED array 220.

Figure 3:
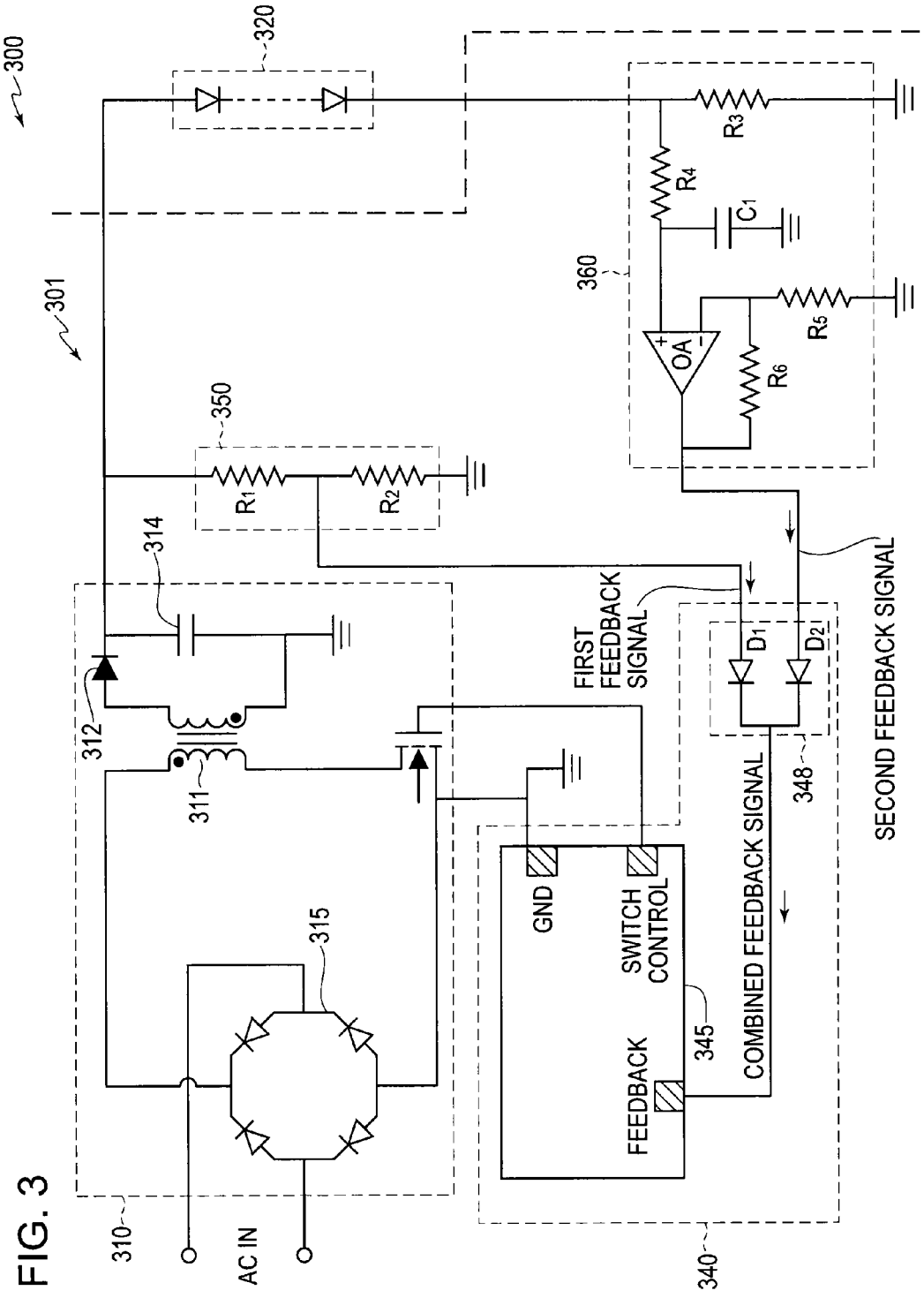
FIG. 3 shows a block diagram of another power system example 300 according to an embodiment of the disclosure.

FIG. 3 shows another block diagram of a power system example 300 according to an embodiment of the disclosure. The power system 300 utilizes certain components that are identical or equivalent to those used in the power system 200; the description of these components has been provided above and will be omitted here for clarity purposes.

In the FIG. 3 example, the current feedback module 360 includes an operational amplifier OA and two resistors R5 and R6 coupled together to form a scaling module. The ratio of the scaling module is determined by a ratio of the two resistors R5 and R6. In this example, a relatively small R3 can be used to reduce power consumption on the sensing resistor R3.

FIG. 4A shows a plot 400A tracing electrical parameters during a cold start-up of the power system 200 according to an embodiment of the disclosure. The cold start-up refers to the LED array having a relatively low temperature, such as a room temperature, at the start-up. The plot 400A includes a voltage curve 410A corresponding to the voltage on the delivering path, and a current curve 420A corresponding to the current flowing through the LED array 220.

The voltage curve 410A and the current curve 420A traces the electrical parameters in the no-load state, the current-up state, and a part of the heat-up state for the power system 200.

In the no-load state, the circuit 245 generates pulses of an initial pulse width to control the switch 213. The voltage on the delivering path rises rapidly. However, before the voltage on the delivering path reaches the forward voltage of the LED array 220, the LED array 220 does not conduct current. Thus the LED array 220 appears as no-load to the power circuit 201.

In the no-load state, the first feedback signal is larger than the second feedback signal. However, before the first feedback signal reaches 2.8V, for example, the circuit 245 continues generating the pulses with the initial pulse width. When the voltage on the delivering path causes the first feedback signal larger than 2.8V, the circuit 245 generates pulses of reduced pulse width to slow down the voltage on the delivering path. Further, when the voltage on the delivering path reaches the forward voltage of the LED array 220, the LED array 220 starts to conduct current, and the power system 200 enters the current-up state.

In the current-up state, the conducted current by the LED array 220 rises. However, before the conducted current reaches certain level, the first feedback signal is larger than the second feedback signal. The circuit 245 continues generating pulses based on the first feedback signal to constrain the voltage on the delivering path. When the conducted current reaches certain level, the second feedback signal is larger than the first feedback signal. Then, the power system 200 enters the heat-up state.

In the heat-up state, the temperature of the LED array rises, and causes changes in the electrical parameters of the LED array 220. For example, the forward voltage starts to drop, and causes possible current rise. In the heat-up state, the second feedback signal is larger than the first feedback signal, thus the circuit 245 generates the pulses based on the second feedback signal to maintain relatively stable current flowing through the LED array 220. It is noted that due to the forward voltage drop of the LED array 220, and the effort by the power circuit 201 to maintain the relatively stable current, the voltage on the delivering path drops.

Figure 4B:
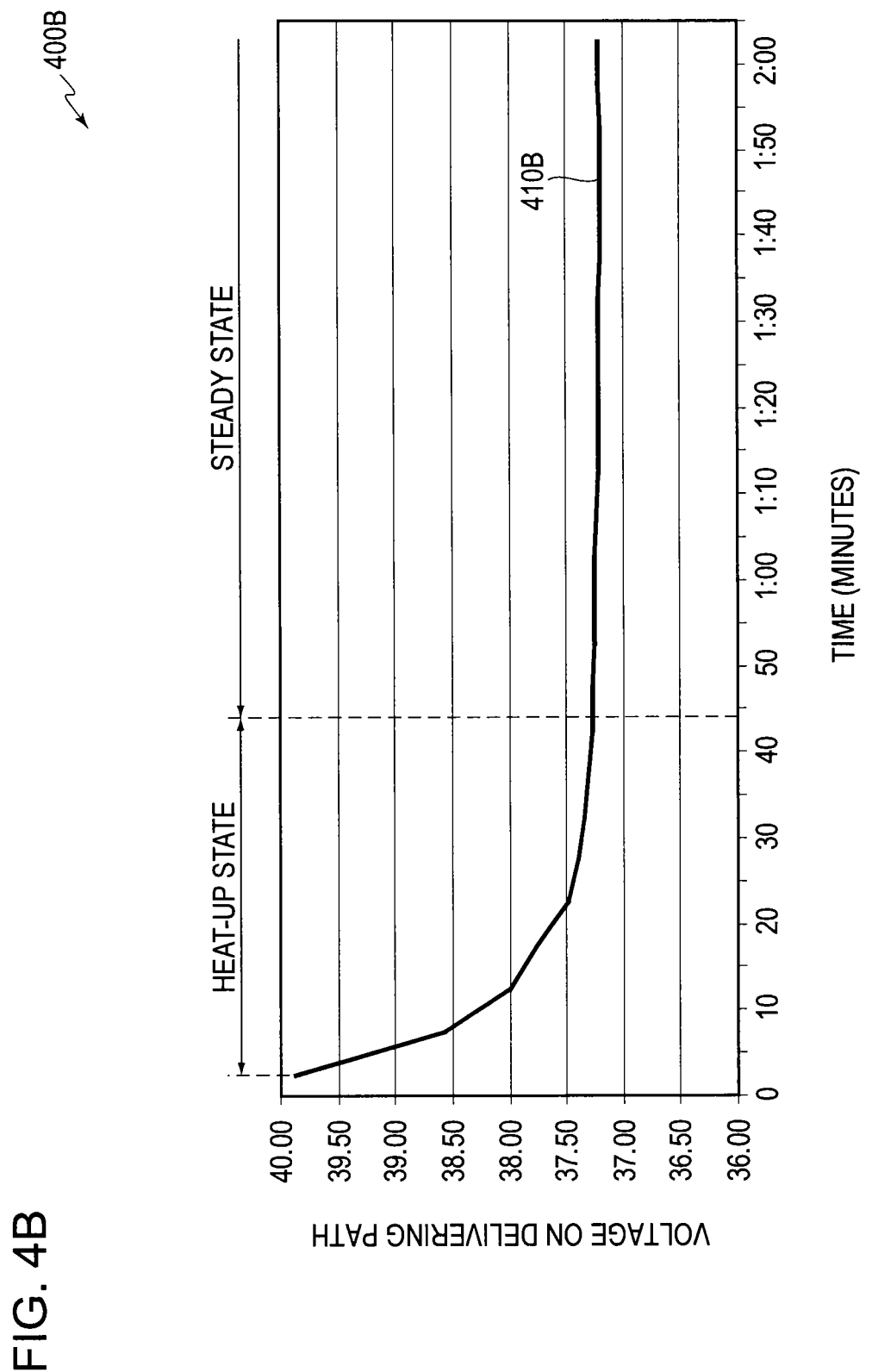
FIG. 4B shows a plot 400B tracing a voltage in the power system example 200 according to an embodiment of the disclosure.

FIG. 4B shows a curve 410B tracing the voltage on the delivering path over the heat-up state and the steady state. In the heat-up state, the voltage on the delivering path drops. In the steady state, the temperature is stable, the electrical properties of the LED array 220 are also stable, and the voltage on the delivering path is also stable.

Figure 4C:
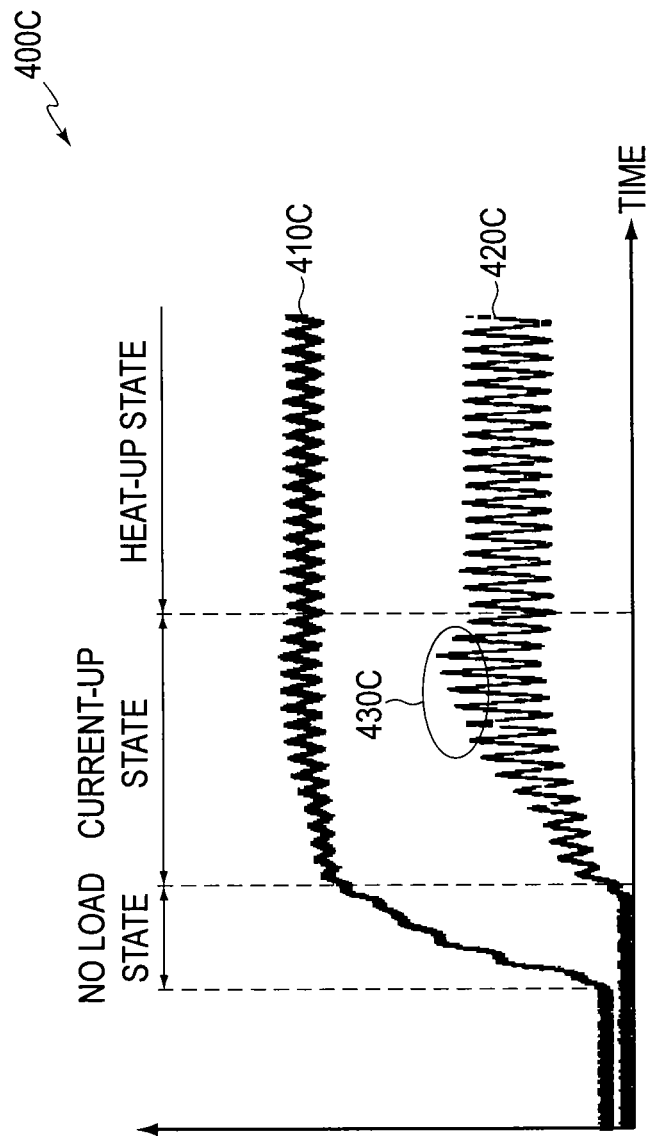
FIG. 4C shows a plot 400C tracing electrical parameters during a warm start-up of the power system example 200 according to an embodiment of the disclosure.

FIG. 4C shows a plot 400C tracing electrical parameters during a warm start-up of the power system 200 according to an embodiment of the disclosure. The curves in the plot 400C have certain properties that are identical or equivalent to those in the plot 400A; the description of these properties has been provided above and will be omitted here for clarity purposes.

The warm start-up refers to the LED array 220 having a relatively high temperature at the start-up. In an example, the power system 200 starts up before the LED array 220 cools down to the room temperature from previous operation. Due to the relatively high temperature, the LED array 220 has a relatively low forward voltage. Thus, when the voltage on the delivering path reaches the specific value, such as corresponding to the forward voltage at the relatively low temperature, the current flowing through the LED array 220 overshoots, as shown by 430C, due to the reason that the LED current based feedback reacts relatively slow. In an embodiment, the power circuit 201 is suitably designed to allow, for example, about 10% overshoots.

Figure 5:
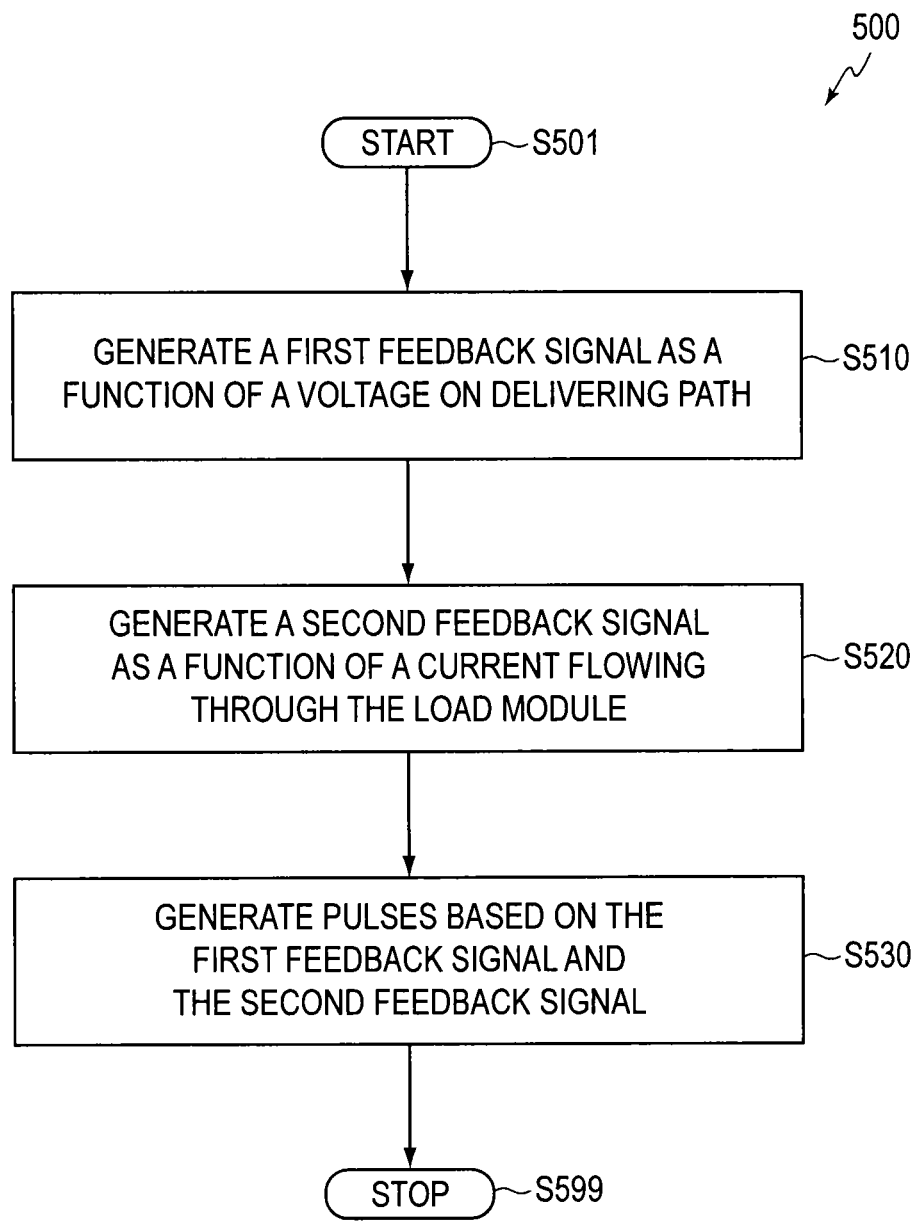
FIG. 5 shows a flow chart outlining a process example 500 for the power circuit 101A to drive the load 120A according to an embodiment of the disclosure.

FIG. 5 shows a flow chart outlining a process example 500 for the power circuit 101A to drive the load 120A according to an embodiment of the disclosure. The process starts at S501, and proceeds to S510.

At S510, the first feedback module 150A generates a first feedback signal as a function of the voltage on the delivering path that delivers electric energy to the load 120A.

At S520, the second feedback module 160A generates a second feedback signal as a function of the current flowing through the load 120A.

At S530, the controller 140A generates pulses based on the first feedback signal and the second feedback signal. The pulses are used to control the switch 113 to receive and deliver the electric energy to the load 120A. Then, the process proceeds to S599 and terminates.

FIG. 6 shows a flow chart outlining a process example 600 for the controller 240 to generate pulses according to an embodiment of the disclosure. The process starts at S601 when the external switch of the power system 200 is switched on, and proceeds to S610.

At S610, the controller 240 initializes a pulse width.

At S620, the controller 240 generates pulses having the pulse width. The pulses are used to control the converter 210 to receive and deliver electric energy to the LED array 220.

At S630, the controller 240 receives the first feedback signal and the second feedback signal. The first feedback signal is generated as a function of the voltage on the delivering path, and the second feedback signal is generated as a function of the current flowing through the LED array 220. In an embodiment, the first feedback signal and the second feedback signal are both voltage signals and are suitably scaled.

At S640, the controller 240 selects the dominant one of the first feedback signal and the second feedback signal. In an embodiment, the controller 240 includes two diodes D1 and D2, such as using the 3-pin diode package 248, to select the larger feedback signal.

At S650, the controller 240 determines whether the selected feedback signal is larger than a limit. When the selected feedback signal is larger than the limit, the process proceeds to S660; otherwise, the process proceeds to S670.

In S660, the controller 240 reduces the pulse width. Then, the process returns to S620 to generate pulses having the reduced pulse width.

In S670, the controller 240 maintains or increases the pulse width. Then, the process returns to S620 to generate pulses having the maintained or increased pulse width.

The process 600 stops when the external switch is switched off.

It is noted that the process 600 can be suitably changed with different implementation of the controller 240. In an example, instead of using the existing circuit 245 and the three-pin diode package 248, a new IC is designed to generate pulses based on the first feedback signal and the second feedback signal. The new IC can include suitable components to perform similar or equivalent functions as the circuit 245 and the three-pin diode package 248, but with different process.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A power circuit, comprising:
    a converter configured to receive electric energy from an energy source, and to deliver the electric energy for driving a load;
    a voltage feedback module configured to continually generate a first feedback signal by dividing a voltage of the delivered electric energy;
    a current feedback module configured to generate a second feedback signal based on a current of the delivered electric energy, the current feedback module including a resistor and a filter coupled to the resistor, the filter configured to reduce high frequency components of the second feedback signal;
    a combining unit comprising at least one diode, the combining unit configured to take as inputs the first feedback signal and the second feedback signal, and to output a feedback signal; and a controller configured to receive the feedback signal from the combining unit and to control the converter to receive and deliver the electric energy based on the feedback signal.

2. The power circuit of claim 1, wherein at least one of the at least one diode is reverse biased based on the first feedback signal or the second feedback signal.

3. The power circuit of claim 1, wherein the at least one diode has an anode and a cathode, the anode receiving the first feedback signal or the second feedback signal.

4. The power circuit of claim 1, wherein the at least one diode is a first diode, the combining unit further comprises:
the first diode having a first anode receiving the first feedback signal and a first cathode; and
a second diode having a second anode receiving the second feedback signal and a second cathode.

5. The power circuit of claim 4, wherein the second cathode is coupled with the first cathode to output the feedback signal corresponding to the first feedback signal or the second feedback signal.

6. The power circuit of claim 5, wherein the feedback signal corresponds to one of the first and second feedback signals, the one having a higher positive voltage than the other feedback signal at an input of the combining unit.

7. The power circuit of claim 1, wherein the converter further comprises:
a transformer having a primary winding on a receiving path and a secondary winding on a delivering path;
a switch configured to switch on the receiving path to receive and store the electric energy and to switch off the receiving path to allow the delivering path to deliver the stored electric energy to the load; and
the controller configured to control a turn-on time of the switch based on the feedback signal from the combining unit.

8. The power circuit of claim 7, wherein the voltage feedback module further comprises:
a voltage divider configured to generate the first feedback signal by dividing the voltage of the delivered electric energy on the delivering path.

9. The power circuit of claim 1, wherein the current feedback module further comprises:
a sensing module configured to generate the second feedback signal as a function of a load current.

10. The power circuit of claim 9, wherein the sensing module comprises:
a resistor coupled with the load in series.

11. A method for driving a load, comprising:
receiving, by a converter, electric energy from an energy source, and delivering the electric energy to drive the load;
generating continually, by a voltage feedback module, a first feedback signal by dividing a voltage of the delivered electric energy;
generating, by a current feedback module, a second feedback signal based on a current of the delivered electric energy, the current feedback module including a resistor and a filter counted to the resistor;
reducing high frequency components of the second feedback signal by the filter;
receiving, by a combining unit having at least one diode, the first feedback signal and the second feedback signal as inputs and outputting a feedback signal; and
receiving, by a controller, the feedback signal from the combining unit and controlling the converter to receive and deliver the electric energy based on the feedback signal.

12. The method of claim 11, further comprising:
reverse biasing at least one of the at least one diode based on the first feedback signal or the second feedback signal.

13. The method of claim 11, further comprising:
receiving, by an anode, the first feedback signal or the second feedback signal, the at least one diode having the anode and a cathode.

14. The method of claim 11, wherein the at least one diode is a first diode, further comprising:
receiving, by a first anode, the first feedback signal, the first diode having the first anode and a first cathode; and
receiving, by a second anode, the second feedback signal, a second diode having the second anode and a second cathode.

15. The method of claim 14, further comprising:
outputting the feedback signal corresponding to the first feedback signal or the second feedback signal by the second cathode coupled with the first cathode.

16. The method of claim 15, further comprising:
selecting one of the first and second feedback signals as the feedback signal, the one having a higher positive voltage than the other feedback signal at an input of the combining unit.

17. The method of claim 11, further comprising:
primary winding on a receiving path and secondary winding on a delivering path by a transformer;
switching on, by a switch, the receiving path to receive and store the electric energy;
switching off, by the switch, the receiving path to allow the delivering path to deliver the stored electric energy to the load; and
controlling a turn-on time of the switch based on the feedback signal from the combining unit.

18. The method of claim 17, further comprising:
generating, by a voltage divider, the first feedback signal by dividing the voltage of the delivered electric energy on the delivering path.

19. The method of claim 11, further comprising:
generating, by a sensing module, the second feedback signal as a function of a load current.

20. The method of claim 19, further comprising:
generating, by the sensing module having a resistor coupled with the load in series, the second feedback signal.

* * * * *